(12) United States Patent
Noda et al.

(10) Patent No.: US 8,308,595 B2
(45) Date of Patent: Nov. 13, 2012

(54) HYBRID DRIVE DEVICE

(75) Inventors: Kazuyuki Noda, Handa (JP); Masashi Kito, Anjo (JP); Yuichi Seki, Okazaki (JP); Satoru Kasuya, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/409,839

(22) Filed: Mar. 1, 2012

(65) Prior Publication Data
US 2012/0247911 A1 Oct. 4, 2012

(51) Int. Cl.
 *F16H 3/72* (2006.01)
(52) U.S. Cl. ............................................. 475/5; 475/116
(58) Field of Classification Search .............. 475/5, 116, 475/137; 192/70.12, 113.34–113.36, 85.61
See application file for complete search history.

(56) References Cited

U.S. PATENT DOCUMENTS

| 7,686,112 | B2 | 3/2010 | Shiiba | |
| 7,819,768 | B2* | 10/2010 | Kinugasa et al. | 475/5 |
| 7,905,807 | B2* | 3/2011 | Shimizu et al. | 475/5 |
| 8,066,090 | B2* | 11/2011 | Shimizu et al. | 475/133 |
| 2007/0173373 | A1* | 7/2007 | Kinugasa et al. | 477/3 |
| 2008/0200301 | A1* | 8/2008 | Shimizu et al. | 477/2 |
| 2008/0207375 | A1* | 8/2008 | Shimizu et al. | 475/127 |

FOREIGN PATENT DOCUMENTS

| JP | A-9-158997 | 6/1997 |
| JP | A-2003-042186 | 2/2003 |
| JP | A-2006-325367 | 11/2006 |
| JP | A-2007-085397 | 4/2007 |
| JP | A-2007-170533 | 7/2007 |
| JP | A-2007-321828 | 12/2007 |
| JP | A-2008-007094 | 1/2008 |
| JP | A-2008-24251 | 2/2008 |
| JP | 2009-127719 | 6/2009 |
| JP | A-2009-257574 | 11/2009 |

OTHER PUBLICATIONS

May 29, 2012 International Search report issued in corresponding International Patent Application No. PCT/JP2012/055037 (with translation).

* cited by examiner

*Primary Examiner* — David D Le
*Assistant Examiner* — Derek D Knight
(74) *Attorney, Agent, or Firm* — Oliff & Berridge, PLC

(57) ABSTRACT

A hybrid drive device including an electric motor; an automatic transmission; a first oil passage; and a second oil passage branched from the first oil passage and that guides the oil to a friction element that is engaged for establishment of a speed in the automatic transmission. An orifice is provided in the first oil passage downstream of the second oil passage. A switching valve for the friction element is provided in the second oil passage to be switched between communicated and blocked states. A hydraulic servo for the friction element is supplied with a hydraulic pressure to control the friction element between engaged, disengaged, and slip states. The switching valve includes a control oil chamber that communicates with the hydraulic servo, and is switched into the blocked state when the friction element is disengaged and into the communicated state when the friction element is engaged or the slip state.

2 Claims, 7 Drawing Sheets

F I G . 1
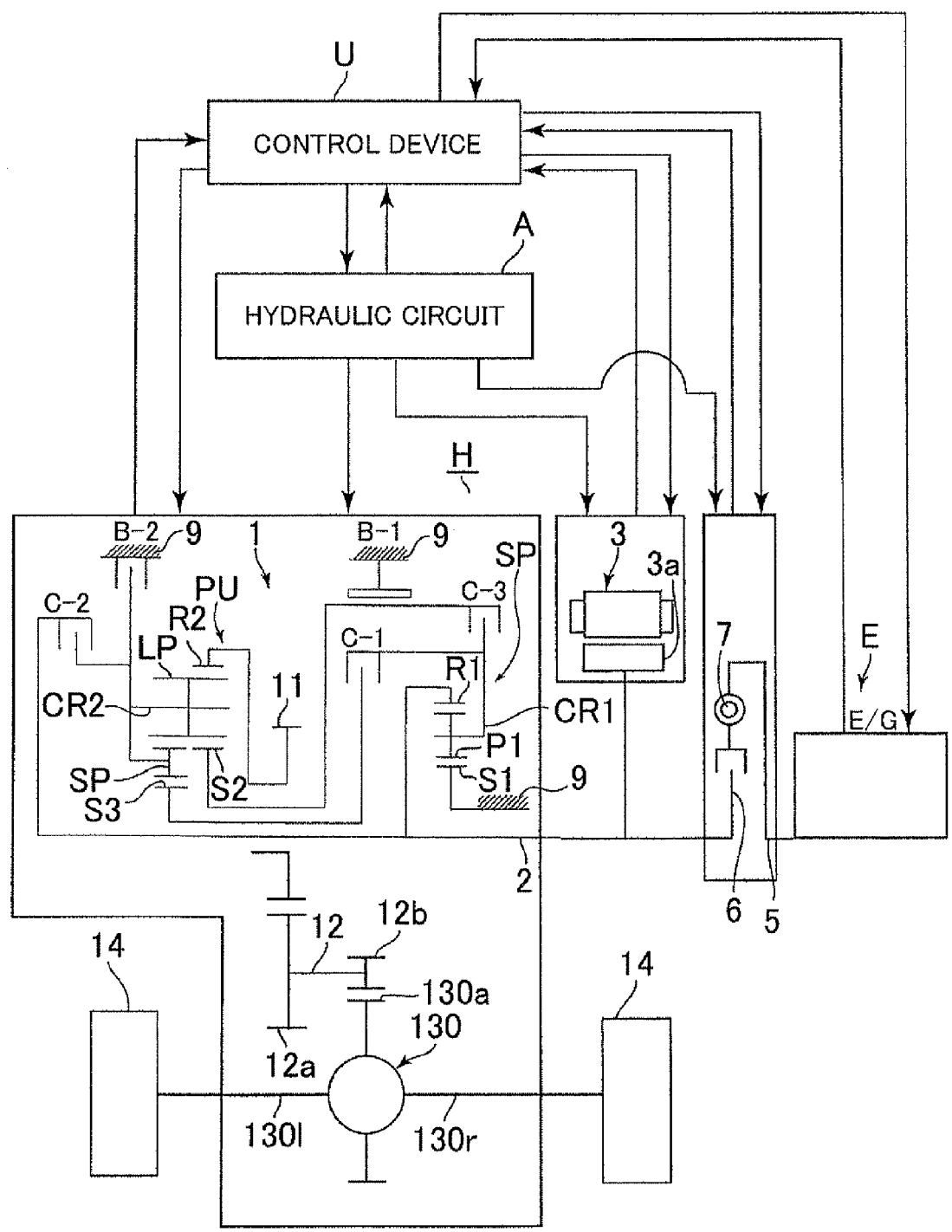

HYBRID DRIVE DEVICE

INCORPORATION BY REFERENCE

The disclosure of Japanese Patent Applications No. 2011-076709 filed on Mar. 30, 2011 and No. 2011-081061 filed on Mar. 31, 2011 including the specification, drawings and abstract is incorporated herein by reference in its entirety.

BACKGROUND OF THE INVENTION

The present invention pertains to a hybrid drive device that includes an engine and an electric motor each serving as a drive source and that transfers power to drive wheels via an automatic transmission, and in particular relates to a lubricating device that directly supplies lubricating oil to a predetermined friction element, such as a brake, of an automatic transmission.

DESCRIPTION OF THE RELATED ART

In a hybrid drive device according to the related art including a first clutch (fastening unit) disposed between an engine and an electric motor and a second clutch (fastening unit; specifically a predetermined clutch or brake of an automatic transmission) disposed between the electric motor and drive wheels, when switching is made from an EV mode in which a vehicle runs with only the electric motor serving as a power source to a running mode in which the engine is used, the first clutch is engaged to cause the electric motor to start the engine. In this event, slip control is performed on the second clutch to reduce shock.

When slip control is performed on the second clutch, the second clutch may be overheated to reduce the durability. Therefore, there has been proposed a control device for a hybrid drive device including a temperature sensing unit that senses the temperature of the first clutch and the second clutch and a control unit that controls the amount of slip of the first clutch and the second clutch in accordance with the temperature of the clutches (Japanese Patent Application Publication No. 2008-7094 (JP 2008-7094 A)).

SUMMARY OF THE INVENTION

In the control device for a hybrid drive device, when the second clutch becomes hot, for example, the amount of slip of the second clutch is suppressed, and slip control is performed on the first clutch in a complementary manner, to prevent the second clutch from being overheated. However, the control device needs a sensor that detects the temperature of the clutches, a control device that performs integrated slip control on the first and second clutches, and so forth, which makes the device large and elaborated to incur a cost increase. When the first clutch is engaged to start the engine with the vehicle running (extremely) slowly with a first speed established in the automatic transmission, it is necessary to rotationally drive the electric motor at an engine starting rotational speed that is higher than an input shaft rotational speed based on running, and to perform slip control on the second clutch in order to absorb the difference in rotation between input and output shafts of the automatic transmission.

In the case where the engine and the electric motor are rotated at a rotational speed that is equal to or more than the input shaft rotational speed based on the running speed when the vehicle is running at an extremely low speed with the engine driving the electric motor to charge a battery, in particular, it is also necessary to perform slip control on the second clutch. In this case, however, the time for which slip control is performed on the second clutch is extended, and it may be difficult for the control device according to No. 2008-7094 (JP 2008-7094 A) to handle such a case.

It is also conceivable to directly supply lubricating oil to the second clutch to cool the second clutch (see Japanese Patent Application Publication No. 2009-257574 (JP 2009-257574 A), for example). Also in this case, a flow rate control valve that leads lubricating oil to various locations where lubrication is necessary is needed, which makes the device large and elaborated to incur a cost increase.

It is therefore an object of the present invention to provide a hybrid drive device that addresses the foregoing issues, in which lubricating oil is supplied to a predetermined friction element subjected to slip control by a switching valve actuated in accordance with a hydraulic pressure for actuating the friction element.

According to a first aspect of the present invention, a switching valve for a predetermined friction element is provided in a second lubricating oil passage which directly supplies lubricating oil to the predetermined friction element, and a hydraulic servo for the predetermined friction element is communicated with a control oil chamber of the switching valve for the predetermined friction element, so that the switching valve is switched in accordance with whether the predetermined friction element is in the completely engaged state or the disengaged state or under slip control. Thus, through simple and reliable control in which the switching valve is switched in accordance with the state of a regulated pressure for the hydraulic servo for the predetermined friction element, the switching valve can be switched quickly and reliably in accordance with the timing when the predetermined friction element needs lubrication, such as during slip control, to supply lubricating oil to the friction element. This prevents a reduction in durability of the friction element, and improves the reliability of control performed by the friction element.

In the hybrid drive device, when slip control is performed on the predetermined friction element which is engaged for establishment of the first speed to absorb a difference in rotation between input and output portions in the case where an electric motor starts an engine or in the case where the electric motor is rotated by power of the engine to charge a battery with a vehicle running at a low speed, lubricating oil can be reliably supplied to the predetermined friction element to prevent the friction element from being overheated and to keep the durability of the friction element. In addition, the switching valve can be switched at accurate and reliable timings to eliminate waste of lubricating oil and to improve the fuel economy performance.

According to a second aspect of the present invention, when the vehicle is running normally, a first switching valve is switched to provide communication with a third lubricating oil passage so that lubricating oil is supplied to an automatic transmission to sufficiently lubricate the automatic transmission which is rotating. When the vehicle is running at a low speed of a predetermined value or less, however, the first switching valve is switched to provide communication with a fourth lubricating oil passage so that lubricating oil is supplied to the electric motor to cool the electric motor. In the case where a remaining battery capacity is low and the internal combustion engine drives the electric motor to charge a battery, in addition, lubricating oil is supplied to the electric motor to prevent the electric motor from being overheated. This allows lubricating oil to be utilized effectively with a simple configuration in which the switching valve is added.

Moreover, when the electric motor starts the internal combustion engine, or in the case where the electric motor is rotated by power of the internal combustion engine to charge a battery, with the first speed established in the automatic transmission and with the vehicle running at a low speed of a predetermined value or less, the predetermined friction element of the automatic transmission is subjected to slip control so as to absorb the difference in rotation between the input and output portions. When a predetermined pressure is supplied to the hydraulic servo for the predetermined friction element, the switching valve for the predetermined friction element is switched to the communicated state to directly supply lubricating oil in the fourth lubricating oil passage to the predetermined friction element via the second lubricating oil passage so that a sufficient amount of lubricating oil is supplied to the predetermined friction element which is subjected to slip control. In this event, the first switching valve supplies lubricating oil to the fourth lubricating oil passage so that lubricating oil is also supplied to the electric motor. This makes it possible to control the output of the electric motor with high accuracy, to perform slip control on the predetermined friction element with high accuracy so as to output smooth torque with little shock to the output portion of the automatic transmission, and to secure the durability of the electric motor and the predetermined friction element, when the electric motor starts the engine or when the electric motor is driven by the engine to charge a battery with the vehicle running at (extremely) slowly.

BRIEF DESCRIPTION OF THE DRAWINGS

FIG. 1 is a schematic diagram showing an automatic transmission according to the present invention and a hybrid drive device that uses the automatic transmission;

DETAILED DESCRIPTION OF THE EMBODIMENT

Figures 2A, 2B:
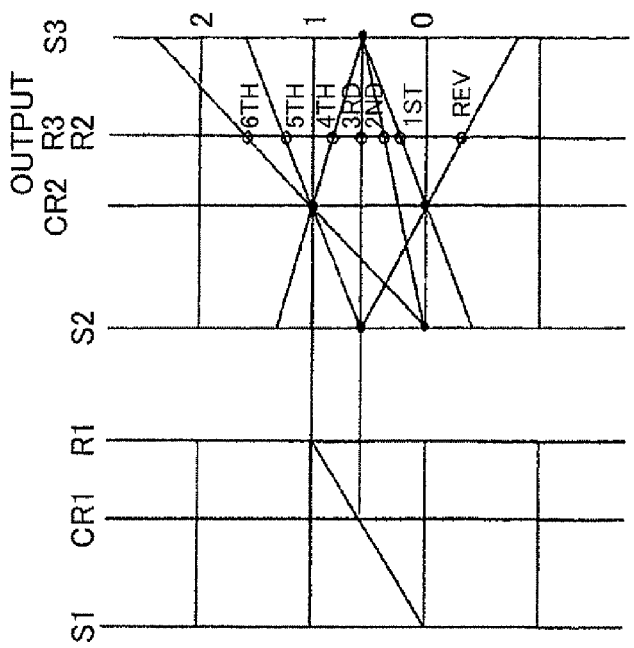
FIG. 2A is an engagement table for the automatic transmission.
FIG. 2B is a velocity diagram for the automatic transmission.

An embodiment of the present invention will be described below with reference to the drawings. As shown in FIG. 1, a rotor 3a of an electric motor 3 is coupled to an input portion 2 (hereinafter referred to as the "input shaft 2") of an automatic transmission 1. A clutch 6 and a torsion damper 7 are interposed between the input shaft 2 and an engine output shaft 5. Thus, the automatic transmission 1 is applied as a one-motor parallel type hybrid drive device H. The electric motor 3 functions as a drive source for a vehicle, as a starter (starter motor) for starting an engine, and further as an alternator (generator) that converts engine power or an inertial force of the vehicle into electric energy. While the clutch 6 and the torsion damper 7 are disposed between the input shaft 2 and the engine output shaft 5, the clutch 6 and the torsion damper 7 may be replaced with a torque converter with a lock-up clutch. In this case, the lock-up clutch assumes the function of the clutch 6.

The input shaft 2 of the automatic transmission 1 is disposed coaxially with the electric motor 3, the clutch 6, and the engine output shaft 5. A planetary gear SP and a planetary gear unit PU are provided on the input shaft 2. The planetary gear SP is a so-called single-pinion planetary gear, which includes a sun gear S1, a carrier CR1, and a ring gear R1 and in which the carrier CR1 includes a pinion P1 meshed with the sun gear S1 and the ring gear R1.

The planetary gear unit PU is a so-called Ravigneaux type planetary gear, which includes four rotary elements, namely a sun gear S2, a sun gear S3, a carrier CR2, and a ring gear R2 and in which the carrier CR2 includes a long pinion LP meshed with the sun gear S2 and the ring gear R2 and a short pinion SP meshed with the sun gear S3 in such a manner that the long pinion LP and the short pinion SP are meshed with each other.

The sun gear S1 of the planetary gear SP is connected to a boss (not shown) integrally fixed to a transmission case 9, which is a fixed member, so as not to be rotatable. The ring gear R1 makes the same rotation (hereinafter referred to as "input rotation") as rotation of the input shaft 2. Further, the carrier CR1 rotates at a speed reduced compared to the speed of the input rotation by the sun gear S1 which is fixed and the carrier CR1 which makes the input rotation. The carrier CR1 is connected to a clutch C-1 and a clutch C-3.

The sun gear S2 of the planetary gear unit PU is connected to a brake B-1 so as to be selectively fixed with respect to the transmission case 9. The sun gear S2 is also connected to the clutch C-3 so as to selectively receive reduced-speed rotation of the carrier CR1 via the clutch C-3. The sun gear S3 is connected to the clutch C-1 so as to selectively receive reduced-speed rotation of the carrier CR1.

Further, the carrier CR2 is connected to a clutch C-2 that receives rotation of the input shaft 2 so as to selectively receive the input rotation via the clutch C-2. The carrier CR2 is also connected to a brake (predetermined friction element) B-2 such that rotation of the carrier CR2 can be selectively stopped via the brake B-2. The ring gear R2 is connected to a counter gear 11. The counter gear 11 is meshed with a counter driven gear 12a on a counter shaft 12. Further, rotation of the counter shaft 12 is transferred to a differential device 130 via a pinion gear 12b and a differential mount gear 130a to be transferred to drive wheels 14, 14 via left and right axles 130l, 130r.

The hybrid drive device H further includes a hydraulic circuit A and a control device U. The hydraulic circuit A communicates with to-be-lubricated portions of the automatic transmission 1 and the electric motor. The control device U is electrically connected to the automatic transmission 1, the electric motor 3, the internal combustion engine E, and the hydraulic circuit A in input and output directions.

In the automatic transmission 1 configured as described above, the clutches C-1 to C-3 and the brakes B-1 and B-2 shown in the skeleton diagram of FIG. 1 are engaged and disengaged in combinations shown in the engagement table of FIG. 2A to establish one of a first forward speed (1st) to a sixth forward speed (Gth) and a first reverse speed (Rev) as shown in the velocity diagram of FIG. 2B.

The brake B-2 is a brake actuated to establish the first speed and the reverse speed, and engaged when starting the vehicle and subjected to slip control when the electric motor 3 starts the engine and charges a battery at an extremely low vehicle speed. That is, the vehicle is brought into a first-speed state by engaging the clutch C-1 and engaging the brake B-2. In the first-speed state, rotation of the input shaft 2 is transferred to the sun gear S3 of the planetary gear PU with the speed of the rotation reduced through engagement of the clutch C-1, and further reduced in speed to be output from the ring gear R2 to the counter gear 11 with the carrier CR2 made stationary by the brake B-2. When starting the vehicle using the first speed, normally, the clutch 6 is disengaged, and the engine is stationary and to be driven by the electric motor 3.

Then, the engine E is started in the first-speed state after the vehicle is started. In this event, the carrier CR2 is rotated by performing slip control on the brake B-2 to absorb the difference in rotation between the sun gear S3 and the ring gear R2.

With the brake B-2 subjected to slip control to absorb the difference in rotation between the input and output shafts, torque of the electric motor 3 is increased and the clutch 6 is engaged to start the engine.

Figure 3:
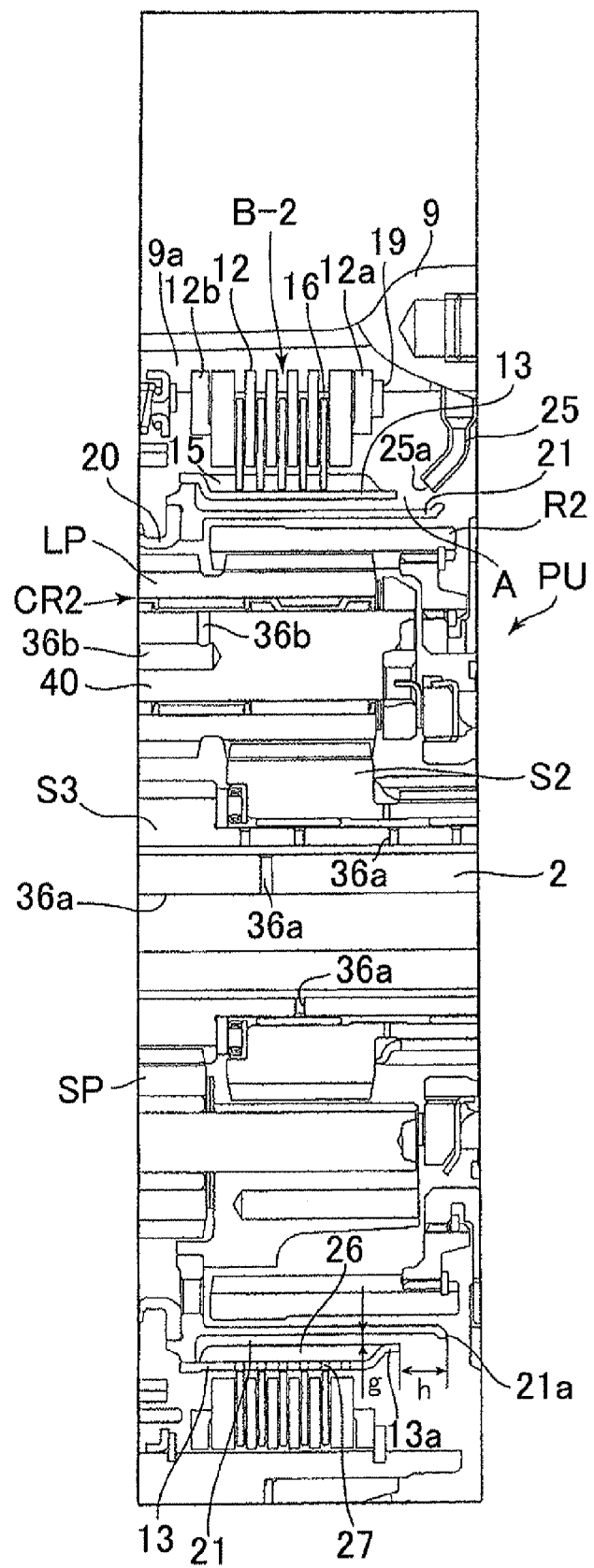
FIG. 3 is a cross-sectional view of the automatic transmission taken so as to include a friction plate lubricating device according to the present invention.

FIG. 3 shows a portion with the brake B-2 subjected to slip control. The brake B-2, which serves as a predetermined friction element among a plurality of friction elements (C-1, C-2, C-3, B-1, and B-2), is formed by a multiplicity of wet friction plates, and includes outer friction plates (brake plates) 12 having teeth that are provided on their outer peripheral surfaces and engage with internal splines 9a of the case 9 and inner friction plates (brake disks) 16 having teeth that are provided on their inner peripheral surfaces and engage with splines 15 of a hub 13. The outer friction plates 12 and the inner friction plates 16 are disposed alternately side by side in the axial direction. An end plate 12a is disposed at a leading end of the outer friction plates 12 with a snap ring 19 preventing the end plate 12a from slipping off. A pressure plate 12b is disposed on the hydraulic piston side.

The hub 13 is integrally secured to a case 20 of the carrier CR2 by welding or the like. The pinions LP and SP forming the carrier CR2 are disposed in the case 20. The ring gear R2 and the sun gears S2 and S3 are meshed with the pinions LP and SP. A sleeve 21 is integrally secured to the carrier case 20 via a predetermined gap g on the inner side of the hub 13. The predetermined gap g between the hub 13 and the sleeve 21 is blocked at an end at which the hub 13 and the sleeve 21 are fixed to each other. Thus, the hub 13 and the sleeve 21 are formed by cylindrical members disposed coaxially with each other and extending in the axial direction in parallel with each other with the hub 13 provided on the outer peripheral side and with the sleeve 21 provided on the inner peripheral side. A distal end 21a of the sleeve 21 is projected to be longer than a distal end 13a of the hub 13 by a predetermined length h, and slightly bent radially outward. A nozzle 25 that injects lubricating oil is disposed at a predetermined position of the case 9 to discharge lubricating oil into the gap g between the hub 13 and the sleeve 21 with an injection port 25a directed to a space A with the predetermined length h.

That is, the carrier CR2, the ring gear R2, and the sun gears S2 and S3 forming the planetary gear PU are disposed radially inwardly of the sleeve 21, and the planetary gear PU is lubricated with lubricating oil from lubricating oil passages 36a and 36b formed in the input shaft 2, the long pinion shaft 40, and so forth.

Figure 4A:
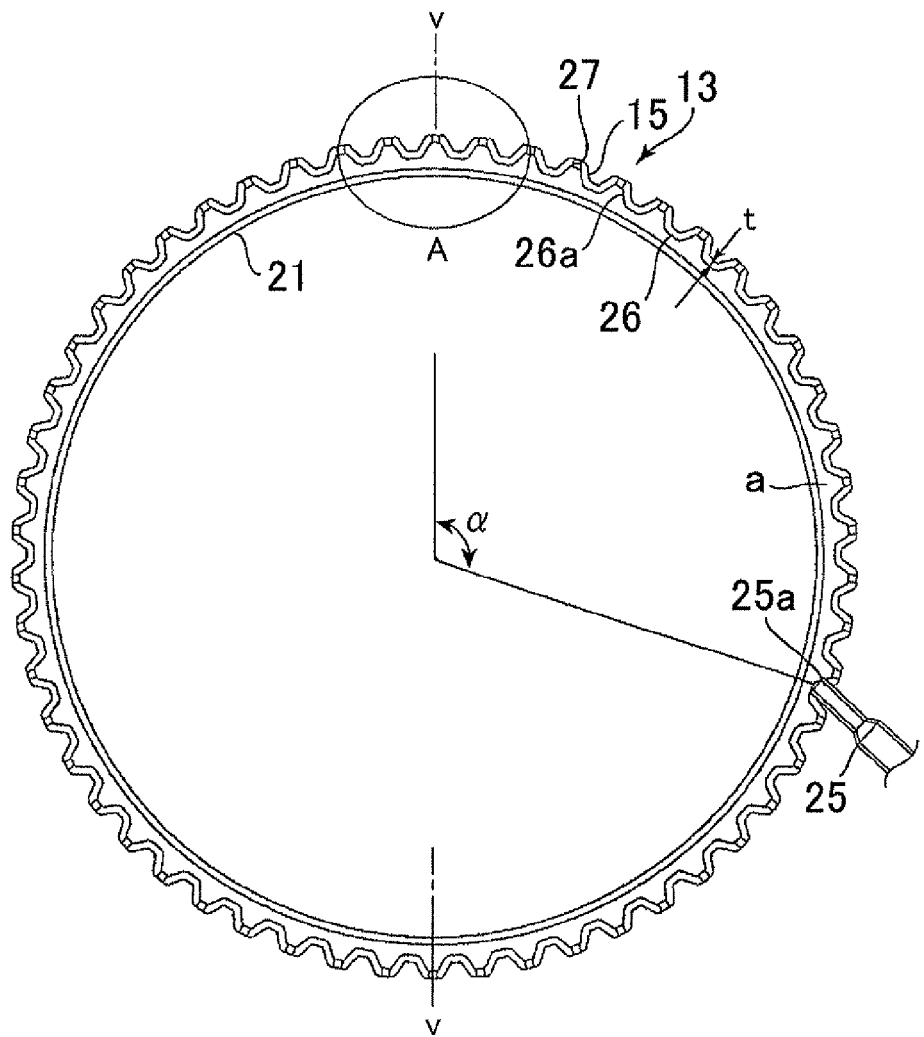
FIG. 4A is a front cross-sectional view showing the friction plate lubricating device.
Figure 4B:
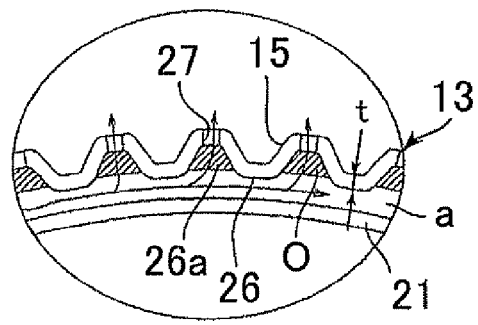
FIG. 4B is an enlarge view of a portion A of FIG. 4A.

As shown in FIG. 4A, the hub 13 includes the splines 15 having a predetermined plate thickness t and formed by pressing dies. The recesses and projections of the hub 13 not only form the splines 15 that engage with teeth of the inner friction plates 16 on the outer peripheral surface of the hub 13, but also form similar recessed/projected portions 26 on the inner peripheral surface of the hub 13 formed over the entire circumference and extending in the axial direction. A large number of small bores (through bores) 27 are formed to penetrate through the bottom surface of each of recessed portions 26a of the recessed/projected portions 26, and arranged at predetermined intervals in the axial direction. As shown in FIG. 4B, the recessed portions 26a serve as oil pools in which lubricating oil O is collected, and the lubricating oil O in the oil pools 26a passes through the small bores 27 to be supplied to the friction plates 12 and 16 of the brake B-2. As shown in FIG. 3, the distal end 13a of the hub is bent so as to lid ends of the recessed portions 26a serving as oil pools to form an annular flange portion.

Figure 5:
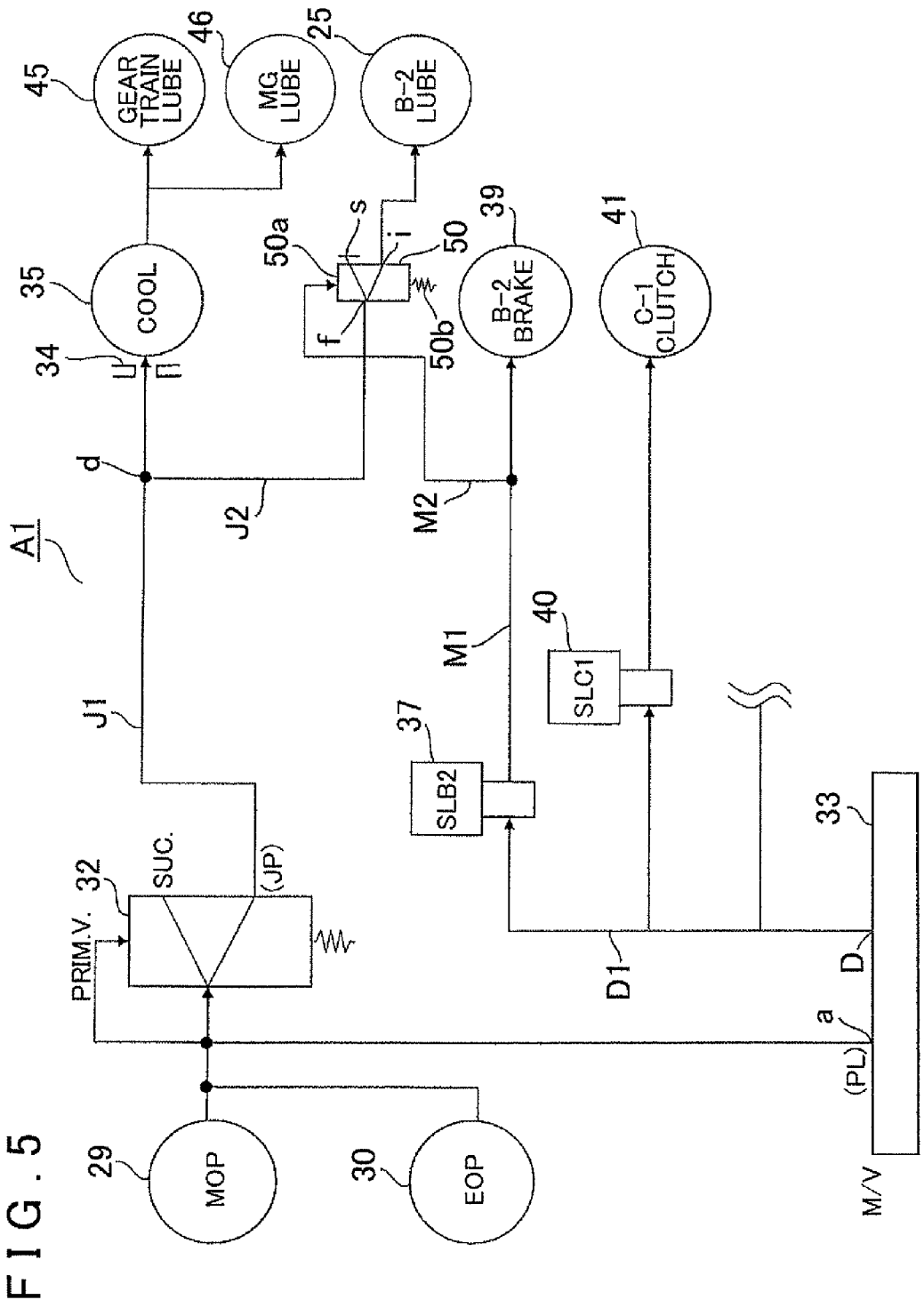
FIG. 5 shows a hydraulic circuit according to a first embodiment of the present invention.

As shown in FIG. 5, a hydraulic circuit A1 according to a first embodiment includes a mechanical oil pump 29 and an electric oil pump 30 driven in conjunction with the input shaft 2 of the automatic transmission 1 (or the engine output shaft). The hydraulic pressure generated by these pumps is regulated to a line pressure PL by a primary regulator valve controlled in accordance with an electric signal from the control device (controller) U. Further, a secondary regulator valve 32 that is also controlled in accordance with an electric signal from the controller is disposed on the discharge side of the primary regulator valve to regulate the hydraulic pressure to a lubricating oil pressure JP. The line pressure PL from the primary regulator valve is led to a manual valve 33. The manual valve 33 is switched by an operation for switching between ranges (P, R, N, D, and so forth) performed by a driver. An operation for selecting the D range communicates a line pressure supply port a with a D-range line pressure port D to supply the line pressure (PL) to an oil passage D1. The line pressure is supplied to a hydraulic servo 39 for the brake B-2 via a linear solenoid valve (SLB2) 37, and supplied to a hydraulic servo 41 for the clutch C-1 via a linear solenoid valve (SLC1) 40. The line pressure PL is supplied not only to the hydraulic servo 39 for the brake B-2, which serves as the predetermined friction element to be engaged when establishing the first speed, and the hydraulic servo 41 for the clutch C-1 but also to hydraulic servos for other friction elements. The hydraulic circuit A1 may be provided with only one of the mechanical oil pump 29 and the electric oil pump 30.

A (first) oil passage J1 to which the lubricating oil pressure JP is supplied from the secondary regulator valve 32 is led to a to-be-lubricated portion 45 of the gear trains (SP, PU) of the automatic transmission 1 via the oil cooler 35 and to a to-be-lubricated/cooled portion 46 of the electric motor. A second lubricating oil passage J2 is branched (d) from the first lubricating oil passage J1 at a portion upstream of the oil cooler 35. The second lubricating oil passage J2 serves as a lubricating oil passage exclusively for B-2 led to the nozzle 25 for lubricating the brake B-2. An orifice 34 is provided in a portion of the first lubricating oil passage J1 downstream of the branch point d at which the second lubricating oil passage J2 is branched. The diameter of the orifice 34 is set such that a predetermined amount of lubricating oil is reliably led to the second lubricating oil passage J2. A switching valve 50 for B-2 (predetermined friction element) is provided in the second lubricating oil passage 32 exclusively for B-2 (predetermined friction element).

The switching valve 50 for B-2 includes a control oil chamber 50a provided at one end portion of a spool. The control oil chamber 50a communicates with an oil passage M1 leading to the hydraulic servo 39 for the brake B-2 via an oil passage M2. That is, the line pressure is regulated by the linear solenoid valve 37, and the regulated pressure is supplied to the hydraulic servo 39 for the brake B-2 through the regulated pressure oil passage M1, and led to the control oil chamber 50a of the switching valve 50 through the branched regulated pressure oil passage M2. The urging force of a spring 50b acts on the other end of the spool to counteract the control oil chamber 50a. The spool switchably provides communication between a supply port f for the second lubricating oil passage J2 exclusively for B-2 and one of an output port i for the to-be-lubricated portion 25 for the brake B-2 and a blocked port s.

Thus, when the electric motor 3 starts the vehicle, the automatic transmission 1 is in the first-speed state, and the brake B-2 serving as the predetermined friction element is engaged. That is, the linear solenoid valve 37 outputs an engagement pressure approximately equal to the line pressure PL, and the engagement pressure is supplied via the regulated pressure oil passage M1 to the hydraulic servo 39 to engage the brake B-2. The engagement pressure in the oil passage M1 is also supplied via the branched regulated pressure oil passage M2 to the control oil chamber 50a of the switching valve 50 for B-2 to switch the switching valve 50 into a communicated state in which the supply port f communicates with the output port i. In this state, lubricating oil in the first lubricating oil passage J1 is supplied to the nozzle, which is the to-be-lubricated portion 25 for the brake B-2, via the second lubricating oil passage J2 exclusively for B-2 and the communication ports f and i of the switching valve 50.

When the vehicle is running at a relatively low speed with the first speed established in the automatic transmission 1, an engine start command is output from the control device U. This causes the linear solenoid valve 37 to output a predetermined hydraulic pressure (slip pressure) between the engagement pressure and the disengagement pressure on the basis of the line pressure PL so that the predetermined hydraulic pressure is supplied via the regulated pressure oil passage M1 to the hydraulic servo 39 for the brake B-2 to perform slip control on the brake B-2. At the same time, the clutch 6 is engaged to cause the electric motor 3 to start the engine. In this event, the electric motor 3 outputs predetermined torque and a predetermined rotational speed to smoothly start the engine while causing the clutch 6 to slip, and slip control is performed on the brake B-2 to absorb the difference in rotation between the input and output shafts and to output smooth torque with little starting shock to the output portion 11. The predetermined hydraulic pressure (slip pressure) in the regulated pressure oil passage M1 is also supplied to the control oil chamber 50a of the switching valve 50 via the branched regulated pressure oil passage M2. The switching valve 50 is maintained in the communicated state, and lubricating oil in the second lubricating oil passage J2 exclusively for B-2 is continuously supplied to the nozzle 25 for lubricating B-2.

When the vehicle is running at a low speed with the first speed established in the automatic transmission 1, the remaining battery capacity (that is, SOC of the battery) may fall short, and the electric motor 3 may be rotated using power from the internal combustion engine E supplied via the clutch 6 to charge the battery. Also in this case, the internal combustion engine output shaft 5 and the input shaft 2 are rotated at higher speeds than during running at a low speed with the first speed established in the automatic transmission 1, and therefore it is necessary to perform slip control on the brake B-2. In this state, the time for slip control is extended compared to when starting the engine. As discussed above, however, lubricating oil is directly supplied to the brake B-2 via the first lubricating oil passage 31, the second lubricating oil passage J2, and the ports f and i of the switching valve 50 so that a relatively large amount of lubricating oil is supplied all during the slip control. This makes it possible to prevent the brake B-2 from being overheated, and to maintain slip control with high accuracy during the charging period.

Lubricating oil in the second lubricating oil passage J2 is discharged from the injection port 25a of the nozzle 25 toward the space A so that the lubricating oil is supplied into the relatively narrow gap g between the hub 13 and the sleeve 21 with almost no lubricating oil leaked from the gap g. Lubricating oil supplied from the nozzle injection port 25a at a predetermined angle $\alpha$ as shown in FIG. 4A enters the oil pools formed by the recessed portions 26a of the recessed/projected portions 26 on the inner peripheral surface of the hub 13 to be spread in the axial direction because of the gravitational force and the centrifugal force due to rotation of the hub 13 and the sleeve 21 based on slip control, and stays in the oil pools 26a because of the centrifugal force to be gradually discharged from the small bores 27 toward the friction plates 12 and 16. The diameter of the small bores 27 is set such that lubricating oil in the oil pools 26a is drained when the hub 13 has made approximately one rotation during slip control. Thus, even if slip control is occasionally performed on the multi-plate brake B-2 with a sufficient amount of lubricating oil supplied to the brake generally uniformly over the entire circumference and the entire length in the axial direction, slip control can be performed without hindrance while securing the durability of the friction plates 12 and 16.

In this event, the lubricating oil O collected in the recessed portions 26a serving as oil pools is not scattered from the lidded distal end 13a by the centrifugal force or the like, but supplied to the brake B-2 with high efficiency without being wasted. In addition, even if a sufficient centrifugal force does not act on the lubricating oil O because the rotational speed of the hub 13 is low, for example, lubricating oil spread in the relatively narrow gap g is not leaked from the space A to the outside, but supplied from the small bores 27 to the brake B-2.

Even during engagement or slip control of the multi-plate brake B-2, lubricating oil supplied from the lubricating oil passages 36a and 36b shown in FIG. 3 to the planetary gear PU is continuously scattered radially outward from radial oil passages because of the centrifugal force. Lubricating oil, the flow rate of which is varied in accordance with the rotational speeds of the rotational shafts 2 and 40 and so forth is blocked by the sleeve 21 disposed to cover the radially outer side of the planetary gear PU, and is not supplied to the oil pools 26a between the sleeve 21 and the hub 13. Thus, only lubricating oil from the nozzle 25 that has passed through the second lubricating oil passage J2 exclusively for B-2 is supplied to the multi-plate brake B-2, and slip control is performed on the multi-plate brake B-2 with an adequate amount of lubricating oil supplied uniformly over the entire circumference and the entire length of the multi-plate brake B-2.

When it is determined that an upshift to the second speed is to be performed in the automatic transmission 1, the linear solenoid valve 37 outputs a disengagement pressure (a pressure of approximately 0) generally corresponding to a drain state. This causes the disengagement pressure in the regulated pressure oil passage M1 to act on the hydraulic servo 39 for B-2 to bring the brake B-2 into the disengaged state, which is combined with engagement of the brake B-1 to implement an upshift to the second speed as described earlier.

In this state, the disengagement pressure in the regulated pressure oil passage M1 also acts on the control oil chamber 50a of the switching valve 50 via the branched regulated pressure oil passage M2, and the switching valve 40 is blocked with the spool moved by the urging force of the spring. Consequently, supply of lubricating oil to the nozzle 25 is stopped, and the brake B-2 is kept in the disengaged state with no drag torque acting thereon.

Switching of the switching valve 50 for B-2 is controlled in accordance with the regulated pressure for the hydraulic servo 39 for B-2. The switching valve 50 for B-2 is switched into the communicated state (in which the supply port f and the output port i are communicated with each other) when the brake B-2 serving as the predetermined friction element is in the completely engaged state, that is, in a state in which a drive force is transferred with no difference in rotation between the input side and the output side of the friction element, and in the slip state, that is, in a state in which a drive force is transferred with a difference in rotation between the input side and the output side of the friction element, and switched into the blocked state (in which the supply port f is blocked by the blocked port s) when the brake B-2 is in the disengaged state, that is, no drive force is transferred between the input side and the output side of the friction element.

Figure 6:
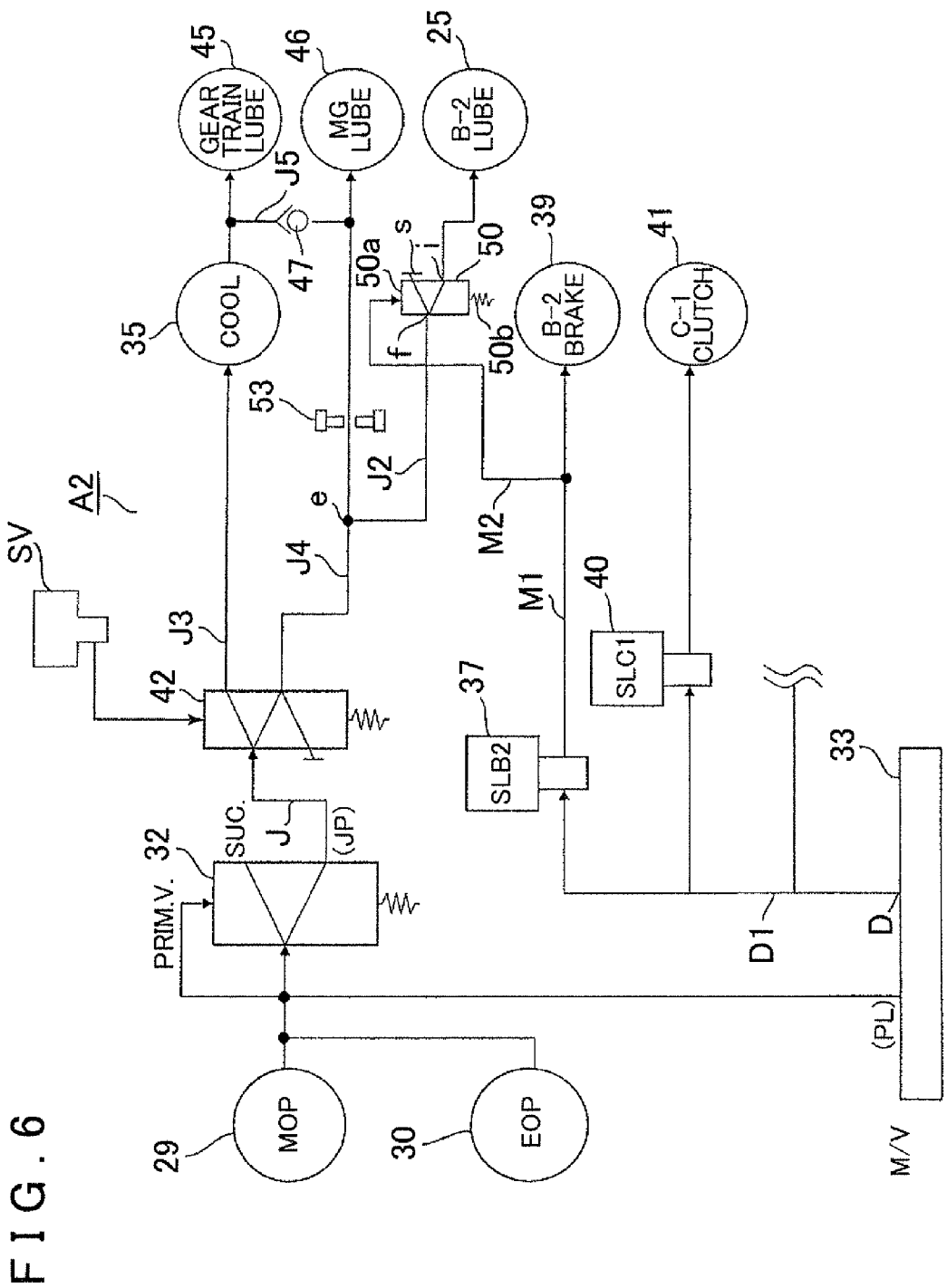
FIG. 6 shows a hydraulic circuit according to a second embodiment of the present invention.

Now, a second embodiment will be described with reference to FIG. 6. Constituent parts similar to those according to the first embodiment shown in FIG. 5 are given the same reference numerals to omit their descriptions. In a hydraulic circuit A2, a (first) switching valve 42 is provided in a lubricating oil passage J to which the lubricating oil pressure JP is supplied from the secondary regulator valve 32. The switching valve 42 is controlled based on a solenoid valve SV that is switched in accordance with a ON/OFF signal from the control device U to switch the lubricating oil passage J between communication with a third lubricating oil passage J3 and communication with a fourth lubricating oil passage 34. The third lubricating oil passage J3 leads to the to-be-lubricated portion 45 of the gear trains (SP, PU) of the automatic transmission 1 such as bearings via the oil cooler 35. The fourth lubricating oil passage J4 leads to the to-be-lubricated/cooled portion 46 of the electric motor 3 such as a stator winding. A communication lubricating oil passage J5 communicates between a portion of the third lubricating oil passage J3 between the oil cooler 35 and the to-be-lubricated portion 45 of the gear trains and the fourth lubricating oil passage J4 leading to the to-be-lubricated/cooled portion 46 of the electric motor. The communication lubricating oil passage J5 includes a one-way valve 47 that allows oil to flow from the third lubricating oil passage J3 to the fourth lubricating oil passage J4.

The second lubricating oil passage J2 exclusively for B-2 is branched from the fourth lubricating oil passage J4. The branched second lubricating oil passage J2 communicates with the to-be-lubricated portion 25 for the brake B-2 via the switching valve 50 for B-2. An orifice 53 is provided between a branched portion e of the fourth lubricating oil passage J4 and the to-be-lubricated/cooled portion 46 of the electric motor to prevent lubricating oil from the communication lubricating oil passage J5 from flowing in reverse to the second lubricating oil passage J2 and to guide a predetermined amount of lubricating oil to the second lubricating oil passage J2. Thus, the fourth lubricating oil passage J4 corresponds to the first lubricating oil passage (J1) which guides lubricating oil passage to a location where lubrication is necessary according to the first embodiment shown in FIG. 5.

Figure 7:
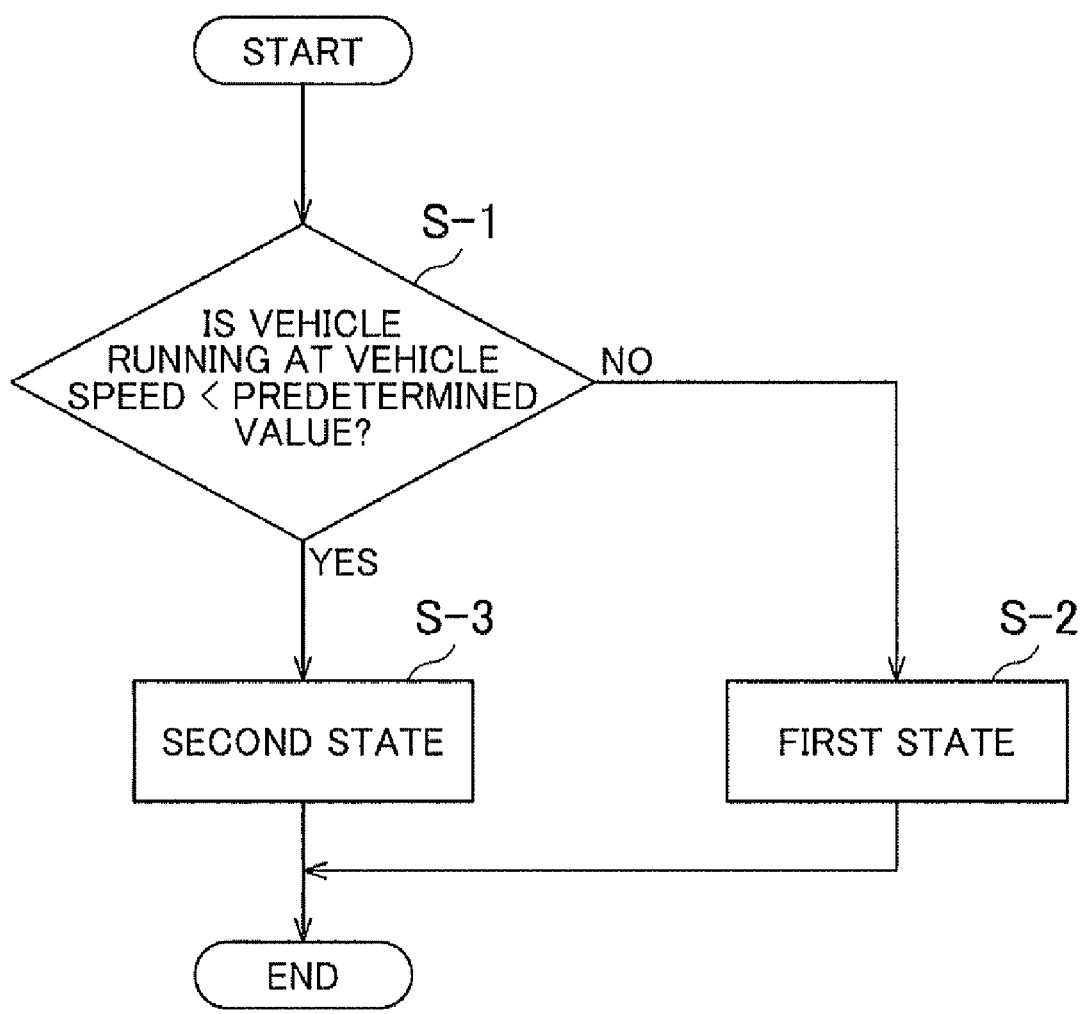
FIG. 7 is a flowchart for a lubricating device according to the present invention.

The first switching valve 42 is switched by the solenoid valve SV. The solenoid valve SV is switched in accordance with an ON/OFF signal from the control device U as shown in FIG. 7. That is, it is determined whether or not the vehicle is running (extremely) slowly at a vehicle speed less than a predetermined speed including a stationary state (S-1). If it is detected that the vehicle speed is a predetermined value or more, that is, it is not determined that the vehicle speed is less than the predetermined value (NO), the switching valve 42 is switched into a first state allowing communication with the third lubricating oil passage J3 (S-2). If it is detected that the vehicle speed is less than the predetermined value (YES), the switching valve 42 is switched into a second state allowing communication with the fourth lubricating oil passage 74 (S-3). The predetermined value is set in correspondence with the first to second speeds, for example. For example, the signal for switching the first switching valve 42 may be a signal indicating detection of a predetermined vehicle speed or less (including the stationary state), or a signal hydraulic pressure that may discriminate the predetermined vehicle speed or less. In the one-motor parallel type hybrid drive device H, the electric motor 3 is driven when starting the vehicle at a low speed or when electricity is generated/charged with the vehicle stationary. Thus, a drive signal for the electric motor may be added to the signal indicating a stationary state of the vehicle. The first switching valve 42 may be a solenoid valve switched in accordance with an electric signal or a valve switched in accordance with a hydraulic pressure.

In the hydraulic circuit A2 according to the second embodiment configured as described above, when the vehicle is stationary, the first switching valve 42 connects the lubricating oil passage J on the supply side to the fourth lubricating oil passage J4 so that lubricating oil is supplied to the to-be-lubricated/cooled portion 46 of the electric motor to cool the electric motor 3. When the vehicle is running at a vehicle speed of the predetermined value or more, the first switching valve 42 connects the oil passage J on the supply side to the third lubricating oil passage J3 so that a relatively large amount of lubricating oil pumped by the mechanical oil pump 29 is supplied to the to-be-lubricated portion 45 of the gear trains via the oil cooler 35 to lubricate the gear trains SP and PU, bearings, and so forth of the automatic transmission 1. Further, a part of lubricating oil in the third lubricating oil passage J3 is supplied to the to-be-lubricated/cooled portion 46 of the electric motor via the one-way valve 47 in the communication lubricating oil passage J5 to cool the electric motor 3. In this event, the orifice 53 prevents lubricating oil passing through the communication lubricating oil passage J5 from flowing in reverse to the second lubricating oil passage J2 exclusively for B-2.

When starting the vehicle, the first speed is established in the automatic transmission 1 with the brake B-2 and the clutch C-1 engaged, the clutch 6 is disengaged, the internal combustion engine E is stationary, and the vehicle runs with the electric motor 3 serving as a drive source. In this event, the vehicle speed is the predetermined value or less, and the first switching valve 42 supplies the lubricating oil pressure JP to the fourth lubricating oil passage J4. Consequently, lubricating oil is supplied to the to-be-lubricated/cooled portion 46 of the electric motor, and the lubricating oil pressure JP is supplied to the supply port f of the switching valve 50 for B-2 via the second lubricating oil passage J2 exclusively for B-2.

With the first speed established in the automatic transmission 1, the linear solenoid valve 37 regulates the line pressure to a predetermined pressure to output the predetermined pressure to the regulated pressure oil passage M1, which supplies the predetermined pressure to the hydraulic servo 39 for the brake B-2 to completely engage the brake B-2. The predetermined regulated pressure in the regulated pressure oil passage M1 is supplied to the control oil chamber 50a of the second switching valve 50 via the branched regulated pressure oil passage M2. The switching valve 50 provides communication between the supply port f and the output port i so that lubricating oil in the second lubricating oil passage J2 is supplied to the to-be-lubricated portion 25 for the brake B-2 through the ports f and i.

When the vehicle is running at a low speed with the first speed established in the automatic transmission 1, the clutch 6 is engaged to transfer torque of the electric motor 3 to the internal combustion engine E to start the engine E. In this event, in general, the electric motor 3 rotates at an engine starting rotational speed that is higher than during running at a low speed. Therefore, it is necessary to absorb the difference in rotation between the input and output shafts of the automatic transmission 1, and the brake B-2 is subjected to slip control. Thus, a relatively large amount of lubricating oil may be supplied to the brake B-2, and the first switching valve 42 and the switching valve 50 for B-2 directly supply the brake B-2 with a relatively large amount of lubricating oil, which is obtained by driving the mechanical oil pump 29 in accordance with the rotational state of the automatic transmission 1. This makes it possible to adequately perform slip control with high accuracy, and to secure the durability of the brake B-2.

When the vehicle is running at a low speed with the first speed established in the automatic transmission 1, the remaining battery capacity (that is, SOC) may fall short, and the electric motor 3 may be rotated using power from the internal combustion engine E supplied via the clutch 6 to charge the battery. Also in this case, the internal combustion engine output shaft 5 and the input shaft 2 are rotated at higher speeds than during running at a low speed with the first speed established in the automatic transmission 1, and therefore it is necessary to perform slip control on the brake B-2. In this state, the time for slip control is extended compared to when starting the engine. As discussed above, however, lubricating oil is directly supplied to the brake B-2 via the fourth lubricating oil passage 34, the second lubricating oil passage J2, and the ports f and i of the switching valve 50 by the first switching valve 42 so that a relatively large amount of lubricating oil is supplied all during the slip control. This makes it possible to prevent the brake B-2 from being overheated, and to maintain slip control with high accuracy during the charging period.

In this event, the vehicle speed is low at a predetermined value or less, and thus the load for lubricating the gear trains of the automatic transmission 1 is not high. When the engine E is started using torque of the electric motor 3, the electric motor 3 is subjected to a load for starting the engine in addition to a load for driving the vehicle. Through output control for the electric motor 3 combined with slip control for the brake B-2, however, the electric motor 3 outputs smooth torque with little shock due to engine start or the like to the output portion 11 of the automatic transmission 1. The electric motor 3 is cooled by lubricating oil in the second lubricating oil passage J2 not to be overheated.

After the engine E is started, engine torque is transferred to the automatic transmission 1 via the clutch 6 so that the vehicle runs exclusively using an engine output. In this state, the vehicle speed becomes a predetermined value or more, and the first switching valve 42 is switched to provide communication with the third lubricating oil passage J3, or an upshift to the second speed is performed, which releases a predetermined pressure for the hydraulic servo 39 for the brake B-2 and switches the switching valve 50 for B-2 to provide communication with the blocked port s. Thus, the lubricating oil pressure JP is supplied to the to-be-lubricated portion 45 of the gear trains via the third lubricating oil passage J3, and the direct supply of lubricating oil to the to-be-lubricated portion 25 for the brake B-2 is blocked.

In the case where the vehicle is running at a vehicle speed of the predetermined value or more, power from the internal combustion engine E, which serves as the only power source, is transferred to the drive wheels via the automatic transmission 1 which establishes one of the multiplicity of shift speeds. In this event, the first switching valve 42 connects the lubricating oil passage J on the supply side to the third lubricating oil passage J3, and lubricating oil is supplied to the to-be-lubricated portion 45 of the gear trains to lubricate the automatic transmission 1 in the running state, as described earlier. In the case where the vehicle is mainly driven by the internal combustion engine E to run, the electric motor 3 rotates under no load, outputs predetermined torque to assist engine drive, or performs regeneration using an inertial force of the vehicle to charge the battery. In the case where the remaining capacity (that is, SOC) of the battery becomes low, the internal combustion engine E rotates the electric motor 3 to cause the electric motor to function as a generator to charge the battery. In this state, a part of lubricating oil from the third lubricating oil passage J3 cooled by the oil cooler is supplied to the to-be-lubricated/cooled portion 46 of the electric motor via the one-way valve 47 to cool the electric motor 3 which is rotating under no load or a low load. This prevents the motor from being overheated.

When the remaining battery capacity becomes low, in addition, the driver stops the vehicle in the P range (or the N range). In this state, the clutch 6 is engaged to cause the engine E to drive the electric motor 3 to charge the battery. In this event, the first switching valve 42 is switched to provide communication between the lubricating oil passage 3 on the supply side with the fourth lubricating oil passage 34 so that lubricating oil is supplied to the to-be-lubricated/cooled portion 46 of the electric motor. This prevents the electric motor 3 from being overheated. Since the hydraulic servo 39 for the brake B-2 is opened, the supply port f of the switching valve 50 for B-2 is blocked, and lubricating oil is not directly supplied to the to-be-lubricated portion 25 for the brake B-2.

In the embodiments discussed above, the present invention is applied to the one-motor parallel type hybrid drive device including the clutch 6. However, the present invention is not limited thereto, and may be applied to a one-motor parallel type hybrid drive device including no clutch and other types of hybrid drive devices.

The lubricating circuit according to the present invention is used in a hybrid drive device including an engine and an electric motor each serving as a drive source and in which power is transferred to drive wheels via an automatic transmission, and the hybrid drive device is mounted on an automobile to be utilized. The present invention is suitable for application to one-motor parallel type hybrid drive devices in which a clutch is interposed between a rotor of an electric motor and an engine output shaft, and particularly suitable for application to hybrid drive devices in which slip control is performed on a predetermined friction element of an automatic transmission when an electric motor starts an engine.

What is claimed is:
1. A hybrid drive device, comprising:
an electric motor;
an automatic transmission that transfers rotation of an input portion to an output portion with a speed of the rotation changed using one of a plurality of shift speeds established by changing a power transfer path using a plurality of friction elements;
a first lubricating oil passage that guides lubricating oil to a location where lubrication is necessary; and
a second lubricating oil passage that is branched from the first lubricating oil passage and that directly guides the lubricating oil to a predetermined friction element that is engaged for establishment of at least a first speed of the plurality of shift speeds, wherein
an orifice is provided in a portion of the first lubricating oil passage downstream of a point at which the second lubricating oil passage is branched, a switching valve for the predetermined friction element is provided in the second lubricating oil passage to be switched between a communicated state and a blocked state, a hydraulic servo for the predetermined friction element is supplied with a predetermined hydraulic pressure regulated by a pressure regulation unit on the basis of a line pressure to control the predetermined friction element to one of a completely engaged state, a disengaged state, and a slip state, and the switching valve for the predetermined friction element includes a control oil chamber that communicates with the hydraulic servo for the predetermined friction element, and is switched into the blocked state in the case where the predetermined friction element is in the disengaged state and into the communicated state in the case where the predetermined friction element is in the completely engaged state or the slip state.

2. The hybrid drive device according to claim 1, wherein a lubricating oil passage to which a lubricating oil pressure obtained by regulating a hydraulic pressure from an oil pump is supplied is provided with a first switching valve that switches between a third lubricating oil passage that guides lubricating oil in the lubricating oil passage to the automatic transmission and a fourth lubricating oil passage that guides the lubricating oil in the lubricating oil passage to the electric motor, the first lubricating oil passage is formed by the fourth lubricating oil passage, and the switching valve for the predetermined friction element is provided in the second lubricating oil passage branched from the fourth lubricating oil passage and leading to the predetermined friction element, and the first switching valve is switched from a state in which the lubricating oil passage communicates with the third lubricating oil passage to a state in which the lubricating oil passage communicates with the fourth lubricating oil passage in the case where a vehicle is running at a speed of a predetermined value or less including a stationary state of the vehicle.

* * * * *